June 2, 1970              C. KOCH              3,515,048
MIRROR REFLEX ATTACHMENT FOR CAMERAS
Filed July 18, 1967              2 Sheets-Sheet 1
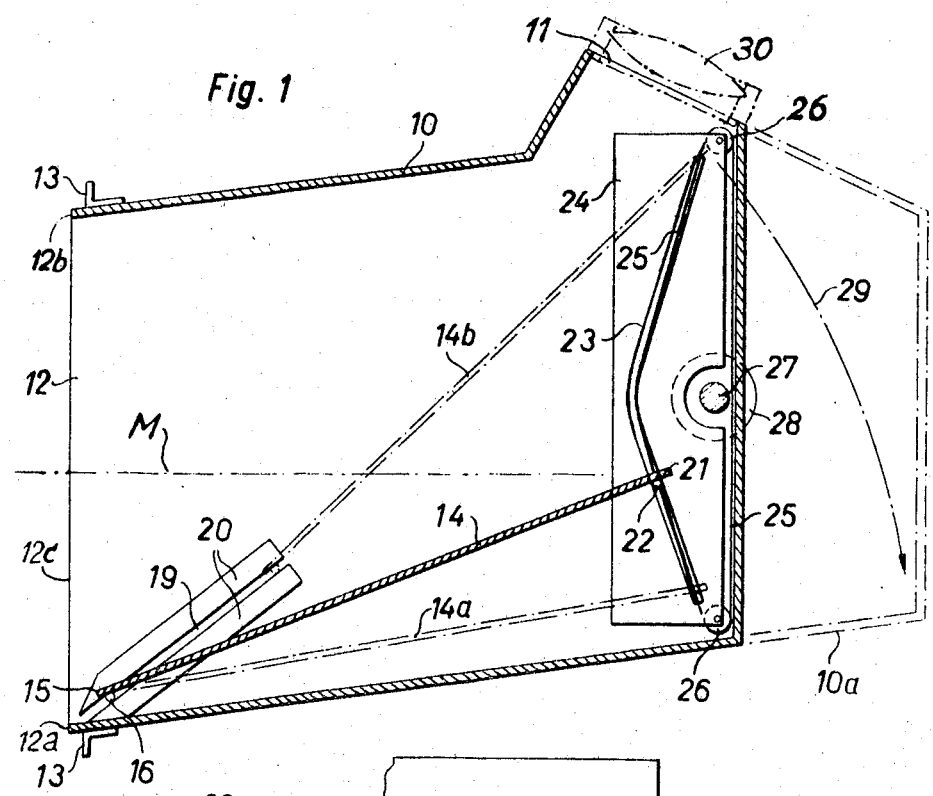
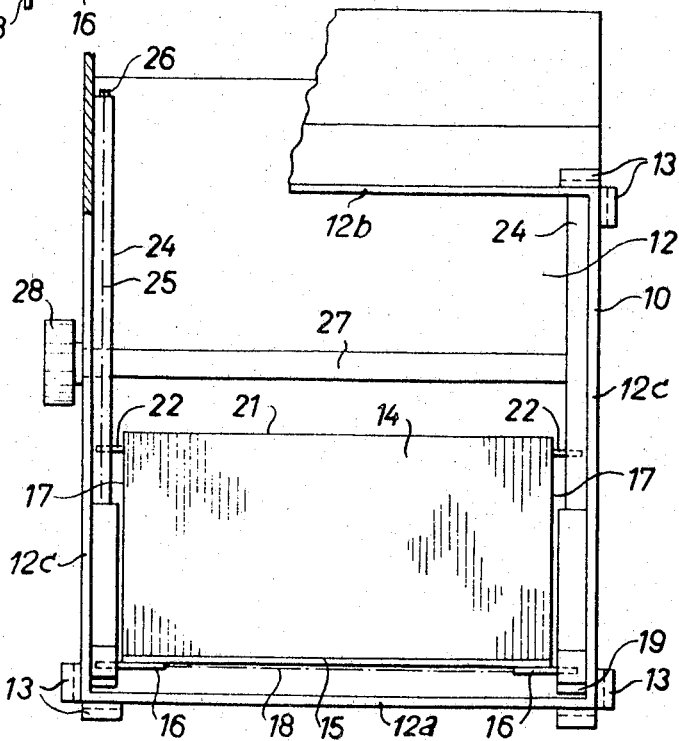
INVENTOR.
Carl Koch
BY
Watson, Cole, Grindle & Watson
Attys.

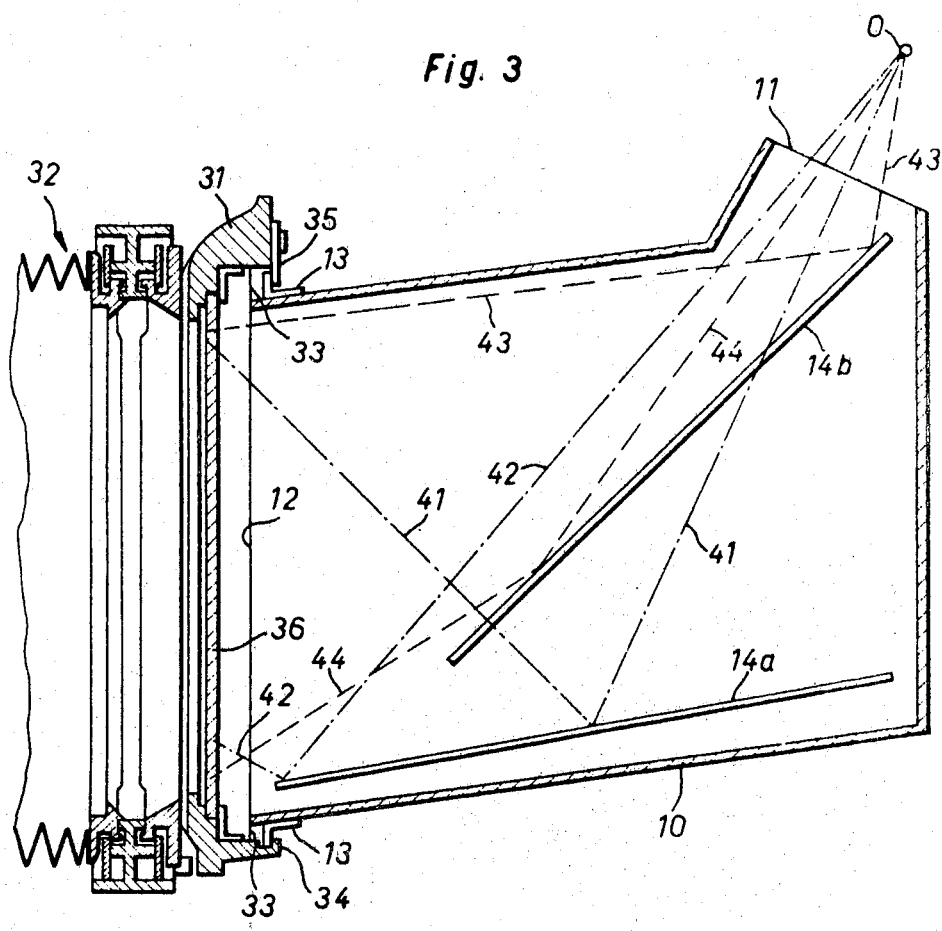

United States Patent Office 3,515,048
Patented June 2, 1970

3,515,048
MIRROR REFLEX ATTACHMENT FOR CAMERAS
Carl Koch, Schaffhausen, Switzerland, assignor to Sinar AG Schaffhausen, Feuerthalen, Switzerland
Filed July 18, 1967, Ser. No. 654,185
Claims priority, application Switzerland, July 19, 1966, 10,615/66
Int. Cl. G03b *13/24*
U.S. Cl. 95—49                4 Claims

ABSTRACT OF THE DISCLOSURE

A mirror-reflex attachment for cameras having a housing in which a mirror is movable and adjustable with means to adjust the mirror toward and away from a mat plate of the camera and also at the same time upwardly and toward a sight opening in housing.

---

This invention relates to a mirror-reflex attachment for cameras.

The object of the present invention is to devise a reflex housing for the viewing of a ground glass or mat plate of a photographic camera, particularly of a large format camera. The reflex housing is particularly destined for such a camera in which the lens carrier and the picture carrier, receiving the ground glass and the reflex housing, are adjustable in relation to one another not only in their reciprocal distance but also in some other manner, for example, by swinging the lens carrier and/or picture carrier, or by shifting at least one of the above mentioned carriers in its own main plane. Cameras have been known in many designs with such shifting characteristics and are usually designated as universal or special cameras.

The viewing of the ground glass image in the camera of the described variety has been made difficult in the most customary design of the camera by the fact that the visibility of the ground glass image will frequently suffer from the incidence of extraneous light, that the ground glass image is upside-down, and that the brightness of the ground glass image decreases the more the direction of incidence of the light rays, producing the part of the image viewed, deviates from the line of vision of the viewer. Vice versa, that part of the image appears brightest which can be viewed in a line pointed toward the center of the lens, so that the light rays will enter the eye directly from the lens. The shorter the focal distance of the lens, the more the light rays striking the ground glass will diverge and the more unfavorable will be the viewing of a single place of observation. Starting out from the brightest part of the image, there develops a strong drop of brightness to all sides. In order to be able to view all parts of the image on the ground glass in succession at the greatest possible brightness, it will be necessary to shift the place of the observing eye by considerable distances, which is not only inconvenient but it also leads to further disadvantages. The known means for the avoidance of extraneous light, such as a black cloth, a focusing hood, a viewing bellows and so forth, are satisfactory depending on their design. The upside-down state of the ground glass image may be met with the aid of a reflecting mirror, as is found in a reflex camera or in a reflex adapter. The decrease in brightness of the ground glass image beginning with the brightest spot can be alleviated by means of an image field lens or Fresnel lens, but it cannot be eliminated in the case of an adjustable universal camera.

In the case of binocular viewing of the ground glass, the decrease in brightness felt subjectively by the viewer in the horizontal is considerably less than it is in the vertical. Therefore, a need exists to produce means for overcoming the decrease of brightness in the vertical, so that the shift of the eyes in a vertical direction will not be required in order to be able to view the entire ground glass image with the greatest brightness.

The feature on which the invention is based now consists in that a reflex housing with a mirror for the ground glass viewing of a camera of the initially mentioned type, is created which will satisfy the described need. The mirror is arranged in a known manner within a housing which has an observing opening for viewing the mirror and an opening for the entry of light to be placed behind the ground glass of the camera, which has about the size of the ground glass and which is delimited by border edges of the housing lying in one plane. The novelty of the reflex housing according to the invention consists essentially in the fact that the mirror is swivelable around a swiveling axis which is in parallel to the plane of the border edges of the opening for the entrance of light, said swiveling axis being located about in the vicinity of one of the border edges of the opening for the entrance of light, the opening being arranged fixedly on a side of the housing, which is opposite to the above mentioned border edge. The mirror can be adjusted in a multiplicity of various swiveling positions between a first end position running approximately at right angles to the plane of the border edges of the opening for the entrance of light, and a second end position may be reached in which the end portion of the mirror, facing away from the swiveling axis, is located directly by the viewing opening.

In the case of a preferred design of the reflex housing according to the invention, the dimension of the mirror, in a direction running at right angles to the swiveling axis, is considerably smaller than the distance of the viewing opening from the border edge of the opening for the entrance of light, located in the neighborhood of the swiveling axis, and the mirror, beside being swivelable, can also slide in its plane in the direction of the above mentioned dimension. By this design it will become possible to make the mirror and the housing smaller, as would be the case with a mirror which was merely swivelable. Then the mirror can be shifted to the place where it is needed at any one time for viewing of the ground or mat glass, namely in its first end position in the direction of the opening for the entrance of light and, in its second end position, from the opening for the entrance of light away to the viewing opening. An operating element arranged on the outside of the housing may be provided, which is in effective connection with the mirror via some operating agents, so that an enforced swiveling movement and a sliding movement will be imparted to the mirror in a predetermined manner upon actuation of the operating element.

Further objects will be apparent from the following description when considered in connection with the accompanying drawings in which:

FIG. 1 is a vertical cross section taken on a longitudinal plane of the mirror-reflex attachment;

FIG. 2 is an end view of the attachment with a part of the housing being cut away and showing the light-ray entry side with the mat disc; and FIG. 3 is a longitudinal section of the mirror-reflex attachment on the back part of a camera where the attachment is secured.

The structure of FIGS. 1 and 2 shows a housing 10 as a part of the mirror-reflex attachment, having a slit-like observation opening 11 and a larger ray type to be applied and light ingress opening 12 which is behind the mat plate of a universal camera which will be referred to relative to the description of FIG. 3. The housing 10 has a plurality of angle holding strips 13 for attachment to the camera so that the attachment may be removably secured on the camera. The light entry opening 12 is formed by two horizontally arranged rim edges 12a and 12b as well as two vertically arranged rim edges 12c around the housing 10 whereby the rim edges 12a, 12b and 12c all lie in a plane.

The inner space of the housing is provided with a movable mirror 14 having an approximately rectangular shape. In the immediate vicinity of the particular rim edge 15 of the mirror which has the light entry opening 12, there is provided two axial side arms 16 having a co-inciding axial axis which projects beyond the side edges 17 of the mirror as shown in FIG. 2. The axial arms 16 form a pivot axis 18 for the mirror 14. The end parts of the axial arms 16 project into a guide groove 19 formed by a pair of spaced rods 20 mounted on the inner side of the housing 10, FIG. 1, and forming a linear guide for the specific side arms 16. By means of the grooves 19, the pivot axis 18 of the mirror 14 may be guided and slidably adjusted in a rectangular direction. The pivot axis is approximately near the lower edge rim 12a of the light entry opening 12 and extends approximately constantly parallel to the plane of the edge rim 12a, 12b and 12c.

Near the edge 21 of the mirror 14 opposite the opening 12 there is likewise secured two axially directed rods 22 provided in such a way that they will project beyond the side edges 17 of the mirror. The axial rods 22 grip into a second guide groove 23, FIG. 1, in a plate 24 secured in the inner sides of the housing 10. The longitudinal direction of the second grooves 23 will switch off from the first guide groove 19 and rims however, also rectangular to the pivot axis 18. FIG. 1 clearly shows that the second guide groove 23 has a bowed or angular configuration.

In each of the guide grooves 23 there is provided a bendable draw or pull member 25, as for example a cord or string which runs over reversible or end rollers or pulleys 26 and under or below the plate 24 to run at least once around a drive shaft 27. The pull member 25 is formed as an endless cord and is secured to the axial rod 22 which slides in the particular groove 23. The shaft 27 is mounted to rotate in the casing or housing 10 and carries at one end a knob on the outside of the housing to act as an operating member to rotate the shaft 27. The pulleys 26 are mounted in slots in the plates 24, not shown in the drawings.

By means of a rotary knob 28 the shaft 27 may be rotated and thereby the mirror 14 may be adjusted as to its position whereby, with the aid of the bendable draw members 25, the two axial rods 22 will slide along in the guide grooves 23. Thereby the mirror 14 will carry out at the same time a pivotal movement in the direction of the plane of the mirror. In one end position 14a, shown in FIG. 1 in broken lines, the mirror will be swung entirely downwardly and against the light entry opening 12. The mirror will be close to a right angle position relative to the plane of the rim edge 12a, 12b, 12c. In another end position 14b, FIG. 1, the mirror assumes a strong lateral position in which at the same time it is adjusted away from the light entry opening 12 toward the observation opening 11. The curved portion of the guide groove 23 will operate the mirror 14 so that in its adjusted position near the first adjusted end position 14a, it will overcome a swinging movement to near the other end position 14b and will overcome a sliding movement by the axial rods 16 sliding in the guide slots 19.

The observation opening 11 is provided in the upper side of the housing 10, that is merely pushed or forced out of the top side, that is opposite to the pivot axis 18 of the mirror coinciding with the rim edge 12a of the light entry opening. Thereby the observation opening 11 has a greater distance from the middle vertical point O to the plane of the edge rims 12a, 12b, 12c of the light entry opening 12 than upper edge rim 12b on the same side of the housing 10.

It is also possible to provide the observation opening 11 with a binocular lens 30, FIG. 1, which is removable in case it is not desired.

The use and operation of the described mirror-reflex attachment is as follows:

The housing 10 is attached to a universal camera 32 on a mat plate frame 31, FIG. 3, by means of securing angle members 13. For this purpose the mat plate frame is provided with projecting shoulders 33 for the rim edges 12a, 12b, 12c of the light entry opening 12 for the mirror-reflex attachment, as also edge means 34 and 35 to grip the angle holding strips 13. When the mirror reflex attachment is in its position of use, the plane of the edge rim 1pa, 12b, 12c of the light entry opening 12 is parallel to the mat plate 36 of the camera.

The photographer is behind the camera and the mirror-reflex attachment, that is to the right of FIG. 3, and looks with both eyes through the slot formed observing opening 11, when he wishes to observe the mat plate 36 of the camera over the mirror 14. In FIG. 3 the middle point of the eye of the photographer is represented at point O. The mirror is drawn in its two end positions 14a and 14b, in which the guide and operating elements for the mirror, for sake of simplicity and better understanding, have been omitted.

When the mirror is adjusted, by swinging to the bottom position, that is the end position 14a, one can observe from the point O, the edge part of the mat plate 36 as a light ray 41 indicated by the broken line 41 in FIG. 3 which as to its reflection on the mirror will be directed obliquely from the bottom to the top on the mat plate. In the same way one can observe the lower end part of the mat plate 36 by a light ray 42 which due to reflection on the mirror likewise falls on the mat plate from the bottom to the top. The same is true for each intermediate parts of the mat plate 36, particularly also for the middle parts. When however the mirror is adjusted to the upper position by a swinging motion, one can observe the light rays 43 from the point O out of the upper rim part of the mat plate 36 and which after reflecting from the mirror laterally from the top to the bottom on the mat plate. The same will be observed from the lower edge part of the mat plate 36 by a light ray 44 which after reflecting from the mirror laterally from above to the bottom falls on the mat plate. The same occurs for each intermediate lying part of the mat plate.

It is obvious that by the adjustment of the mirror, it can be placed in a plurality of possible positions between the two end positions 14a and 14b as shown, and practically every part of the mat plate 36 can be observed by means of a light ray.

Since the direction of projection on the mat plate is adjustable as desired vertical to the mat plate or with reference to the verticals around a desired angle, and since the degree of brightness of each picture part to be observed on the mat plate whichever is the greater, then the direction of the projection of the light rays to be observed with the coming from the objective of the camera, then the picture point to be observed by the light rays must agree with each other so that it is possible by suitable adjustment of the mirror that each picture part of the mat plate is provided with the greatest light intensity, even then when the direction for the camera objective as to the light rays from the vertical to the mat plate is comparatively divided. The latter is, for example, the case upon use of an extreme short width of light as to the angle of the objective upon strong lateral angle of the picture carrier relative to the objective carrier of the camera or upon vertical adjustment of the picture carrier and the objective carrier relative to each other.

When, for example, the camera objective is moved relative to the mid-vertical line M of the mat plate 36 considerably upwardly, then it is necessary to swing the mirror 14 of the mirror-reflex member toward the lower end position 14a, so that light rays 41, 42 to be used to observe the mat plate, will have their reflection at the mirror laterally from the bottom to the top in the direction against the objective moved upwardly to reach the mat plate which will produce the greatest possible light intensity for the observer. If however the camera objective relative to the middle vertical line M of the mat plate 36 is sharply adjusted downwardly, then one swings the mirror 14 toward the upper end position 14b so that the light rays 43, 44 to be observed from the mat plate after their reflection at the mirror will be directed laterally from the top to the bottom, that is again in the direction against the objective on the mat plate, so that the mat plate picture will again be observed in the greatest possible brightness. When however the center of the camera objective is on the middle vertical direction M of the mat plate 36, it is necessary that the mirror 14 shall be brought in the middle position, not shown, for the mat plate observation, in which the axis line or pins 22 of the mirror shall lie in the vertex of the guide groove 23, FIG. 1. In all three mentioned cases one can attain a comparatively small swinging of the mirror around the indicated swing position, so that the picture part to be observed will have the greatest possible brilliance even if at the bottom, in the middle, or at the top of the mat plate.

It is however possible, relative to the observation of the mat plate, to attain the operation with a mirror, so that a light entry opening 12 can be directly pivoted around a swing axis but not also slidable, as described and shown in the structure shown. In that case the mirror must be comparatively larger and reach the said stationary swing axle to the observation opening 11, so that each point reflected from the opening 12 to the edge rim of the mirror must swing lengthwise of a curved line 29, FIG. 1. This larger mirror would require a relatively larger housing 10a, FIG. 1, as shown in broken lines.

Thereby a part of the so enlarged mirror would not be used to project the picture, as can be seen in the ray path in FIG. 3.

In view of the above description, the structure according to the invention is as well swingable also in its plane of movement of the mirror so that the drawbacks of larger mirrors and larger housings will be obviated. Particularly the attained reduction of the dimensions of the housing is an essential advantage. Thereby there will result also in the advantage of a lower weight and low production costs.

The described and illustrated mirror-reflex attachment has further advantages in that the swinging movement and the sliding movement of the mirror 14 from one single adjusting knob 28 to a definite and positively correct control is attained, so that the stationary observation opening 11 provides a good possibility to observe the picture on the mat plate with both eyes and by secure, lateral observation direction. Also, the housing 10 will prevent the entry of damaging and unwanted light to the back side of the mat plate 36 is mostly prevented and therefor the mat plate picture is brilliant.

In order to achieve the above described combination of a swing and sliding movement of the mirror, it is not in every case essential to provide a drive mechanism with a guide groove 23 in which the axially mounted elements 22 will move, the flexible pull cable 25, the rollers 26 and the shaft 27. In a modified structure, not shown, one can provide a varient in which in place of the mentioned driving and adjusting members other means can be used, as for example those in which arms are secured on the shaft 27 which will grip the mirror 14 on the bottom and approximately in the middle part of the mirror with a linkage or connected in any other way. The shaft is thereby necessarily somewhat wider to secure it at the bottom as compared with the structure of FIGS. 1 and 2.

I claim:

1. Reflex housing with border edges and a mirror for the viewing of a mat glass plate of a photographic camera, particularly for such a photographic camera where the lens carrier and the picture carrier receiving the glass plate and the reflex housing are adjustable in relation to one another not only in respect to their reciprocal distance but also in some other manner, whereby the mirror is arranged inside the housing which has a viewing opening for viewing the mirror and an opening for the entrance of light, intended to be attached behind the ground glass plate, comprising means for mounting the mirror so that it is swivelable around a swipeling axis which latter is parallel to the plane of the border edges of the opening for the entrance of light, said swiveling axis being located approximately near one of the border edges of the opening for the entrance of light, the viewing opening being arranged on a side of the housing which is opposite to one of the border edges, means for adjusting the mirror as desired in a multiplicity of various swiveling positions between a first end position running at approximately right angles to the plane of the border edges of the opening for the entrance of light, and a second end position in which the end part of the mirror facing away from the swiveling axis is located directly at the viewing opening, and an operating element provided on the outside of the housing and connected with the mirror by a driving means to impart an enforced swiveling and sliding movement in a predetermined manner to the mirror so that the latter will be shifted in a first end position toward the opening for the entrance of light and in its second end position away from the opening for the entrance of light toward the viewing opening.

2. Reflex housing with border edges and a mirror for the viewing of a mat glass plate of photographic camera, particularly for such a photographic camera where the lens carrier and the picture carrier receiving the glass plate and the reflex housing are adjustable in relation to one another not only in respect to their reciprocal distance but also in some other manner, whereby the mirror is arranged inside the housing which has a viewing opening for viewing the mirror and an opening for the entrance of light, intended to be attached behind the ground glass plate, comprising means for mounting the mirror so that it is swiveable around a swiveling axis which latter is parallel to the plane of the border edges of the opening for the entrance of light, said swiveling axis being located approximately near one of the border edges of the opening for the entrance of light, the viewing opening being arranged on a side of the housing which is opposite to one of the border edges, means for adjusting the mirror as desired in a multiplicity of various swiveling positions between a first end position running at approximately right angles to the plane of the border edges of the opening for the entrance of light, and a second end position in which the end part of the mirror facing away from the swiveling axis is located directly at the viewing opening, the swiveling axis of the mirror being movable along a guide in a direction running at right angles to the swiveling axis, and an end part of the mirror which faces away from the swiveling axis being movable by driving means in a direction which deviates from the direction of a first guide, which is also at right angles to the swiveling axis but still in another direction, and the driving means having a second guide attached to the mirror and a flexible traction element connecting an operating element with the driving means, the second guide running in a second direction, which deviates from the direction of the first guide.

3. Reflex housing with border edges and a mirror for the viewing of a mat glass plate of a photographic camera, particularly for such a photographic camera where the lens carrier and the picture carrier receiving the glass plate and the reflex housing are adjustable in relation to one another not only in respect to their reciprocal distance but also in some other manner, whereby the mirror is arranged inside the housing which has a viewing opening for viewing the mirror and an opening for the entrance of light, intended to be attached behind the ground glass plate, comprising means for mounting the mirror so that it is swivelable around a swiveling axis which latter is parallel to the plane of the border edges of the opening for the entrance of light, said swiveling axis being located approximately near one of the border edges of the opening for the entrance of light, the viewing opening being arranged on a side of the housing which is opposite to one of the border edges, means for adjusting the mirror as desired in a multiplicity of various swiveling positions between a first end position running at approximately right angles to the plane of the border edges of the opening for the entrance of light, and a second end position in which the end part of the mirror facing away from the swiveling axis is located directly at the viewing opening, the swiveling axis of the mirror being movable along a guide in a direction running at right angles to the swiveling axis, and an end part of the mirror which faces away from the swiveling axis being movable by driving means in a direction which deviates from the direction of a first guide, which is also at right angles to the swiveling axis but still in another direction, and the second guide having a curved course, so that upon operation of the operating element the mirror will receive in the vicinity of its first end position an overwhelmingly swiveling movement and in the vicinity of the second end position an overwhelmingly sliding movement.

4. Reflex housing with border edges and a mirror for the viewing of mat glass plate of a photographic camera, particularly for such a photographic camera where the lens carrier and the picture carrier receiving the glass plate and the reflex housing are adjustable in relation to one another not only in respect to their reciprocal distance but also in some other manner, whereby the mirror is arranged inside the housing which has a viewing opening for viewing the mirror and an opening for the entrance of light, intended to be attached behind the ground glass plate, comprising means for mounting the mirror so that it is swivelable around a swiveling axis which latter is parallel to the plane of the border edges of the opening for the entrance of light, said swiveling axis being located approximatley near one of the border edges of the opening for the entrance of light, the viewing opening being arranged on a side of the housing which is opposite to one of the border edges, means for adjusting the mirror as desired in a multiplicity of various swiveling positions between a first end position running at approximately right angles to the plane of the border edges of the opening for the entrance of light, and a second end position in which the end part of the mirror facing away from the swiveling axis is located directly at the viewing opening, the swiveling axis of the mirror being movable along a guide in a direction running at right angles to the swiveling axis, and an end part of the mirror which faces away from the swiveling axis being movable by driving means in a direction which deviates from the direction of a first guide, which is also at right angles to the swiveling axis but still in another direction, and the driving means having a second guide attached to the mirror and a flexible traction element connects an operating element with the driving means, the second guide running in a second direction, which deviates from the direction of the first guide, the flexible traction element being continuous and being guided by a part which is rotatable by means of the operating element, and at least one reversing element whereby one part of the traction element runs along the second guide.

References Cited

UNITED STATES PATENTS 2,640,388    6/1953    Shapiro _____ 95—42 X

JOHN M. HORAN, Primary Examiner